(12) United States Patent
Hibi et al.

(10) Patent No.: US 6,870,575 B2
(45) Date of Patent: Mar. 22, 2005

(54) SCREEN-NOISE ELIMINATING APPARATUS AND CATHODE-RAY TUBE DISPLAY APPARATUS

(75) Inventors: Taketoshi Hibi, Tokyo (JP); Hiroshi Sasaki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 456 days.

(21) Appl. No.: 09/909,951

(22) Filed: Jul. 23, 2001

(65) Prior Publication Data

US 2002/0030761 A1 Mar. 14, 2002

(30) Foreign Application Priority Data

Sep. 12, 2000 (JP) ........................................ 2000-276215

(51) Int. Cl.⁷ .............................. H04N 5/21; H04N 3/34
(52) U.S. Cl. ........................ 348/625; 348/607; 348/382; 348/380
(58) Field of Search ................................. 348/607, 627, 348/626, 625, 628, 629, 806, 811, 812, 909, 910, 380, 382; 313/471, 421; 315/371, 370; 382/266, 275, 263, 274, 255

(56) References Cited

U.S. PATENT DOCUMENTS

| | | | | |
|---|---|---|---|---|
| 3,980,819 A | * | 9/1976 | Schwartz | 348/625 |
| 4,048,655 A | * | 9/1977 | Hofmann | 348/544 |
| 4,080,628 A | * | 3/1978 | Jirka | 348/625 |
| 4,185,301 A | * | 1/1980 | Mitsuda et al. | 348/626 |
| 4,386,434 A | * | 5/1983 | Gibson et al. | 348/627 |
| 4,754,322 A | * | 6/1988 | Okuda et al. | 348/669 |
| 4,894,711 A | * | 1/1990 | Barten | 348/812 |
| 4,914,426 A | * | 4/1990 | Schine | 345/13 |
| 4,916,538 A | * | 4/1990 | Carver et al. | 348/625 |
| 5,014,119 A | * | 5/1991 | Faroudja | 348/613 |
| 5,414,330 A | * | 5/1995 | Tsujihara et al. | 315/371 |
| 5,428,455 A | * | 6/1995 | Hosoya et al. | 386/114 |
| 5,587,745 A | * | 12/1996 | Griepentrog et al. | 348/626 |
| 5,592,230 A | * | 1/1997 | Yoshino | 348/448 |
| 5,694,004 A | * | 12/1997 | Kimiya et al. | 315/15 |
| 5,892,551 A | * | 4/1999 | Uematsu | 348/447 |
| 6,549,244 B1 | * | 4/2003 | Ueyama | 348/626 |

FOREIGN PATENT DOCUMENTS

| | | |
|---|---|---|
| JP | A 2-114770 | 4/1990 |
| JP | A 4-246684 | 9/1992 |
| JP | A 10-023290 | 1/1998 |

* cited by examiner

Primary Examiner—Michael H. Lee
Assistant Examiner—Jean W. Désir
(74) Attorney, Agent, or Firm—Birch, Stewart, Kolasch & Birch, LLP.

(57) ABSTRACT

A screen-noise eliminating apparatus including beam-spot-length control means for increasing or decreasing the vertical length of a beam spot on a display screen generated by an electron of a cathode-ray tube for displaying a TV signal; vertical enhancement means for enhancing a given vertical-direction spatial frequency characteristic of said TV signal; and noised elimination control means for controlling said beam-spot-length control means and said vertical enhancement means so as to compensate according to the increase of decrease of said beam spot length.

15 Claims, 11 Drawing Sheets

Fig.2
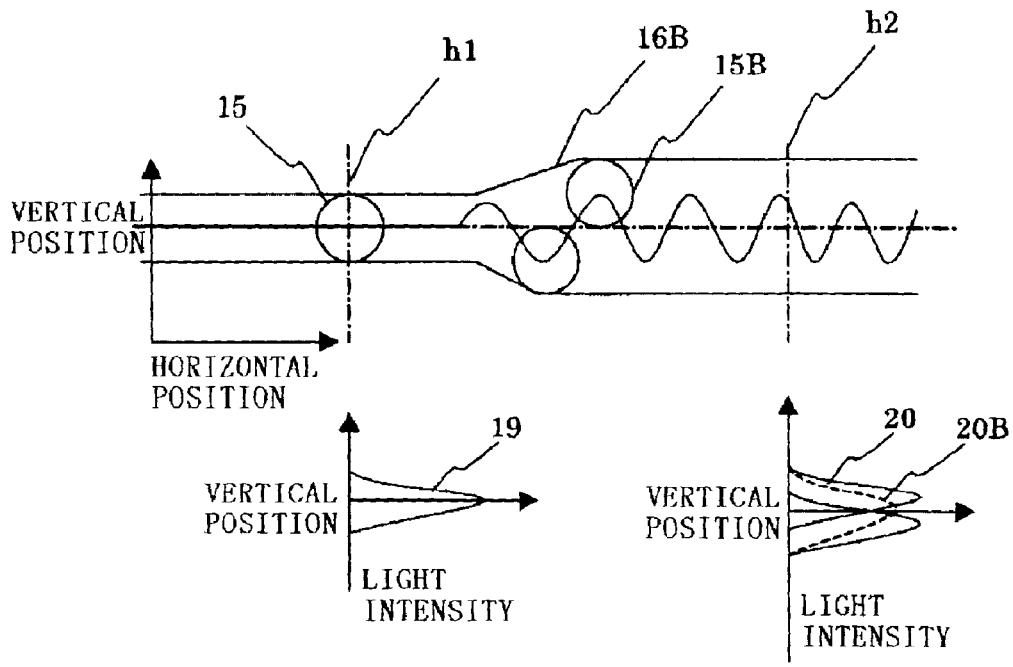
(A) WOBBLING
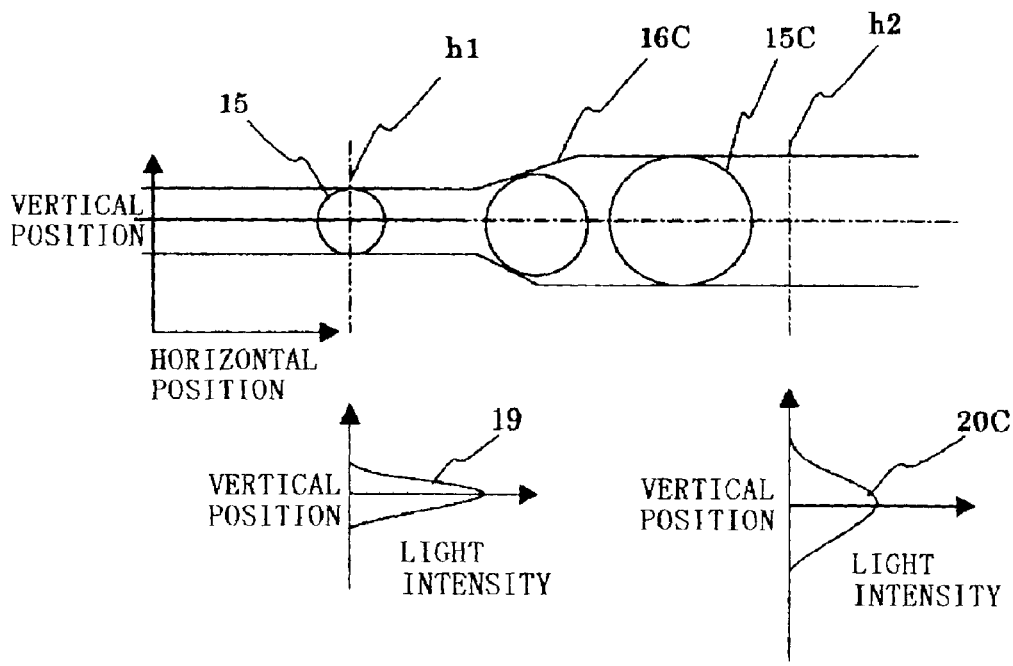
(B) ELECTRIC FOCUS

Fig.6
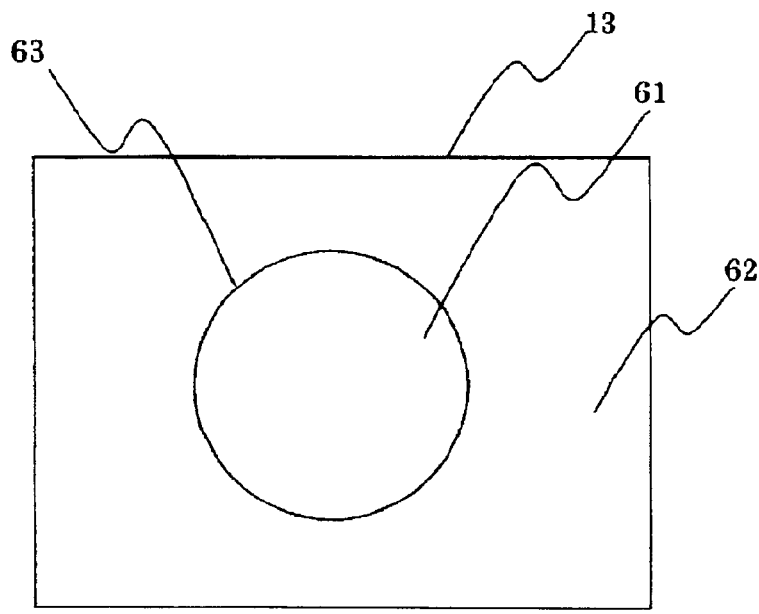
(A) DISPLAYED IMAGE
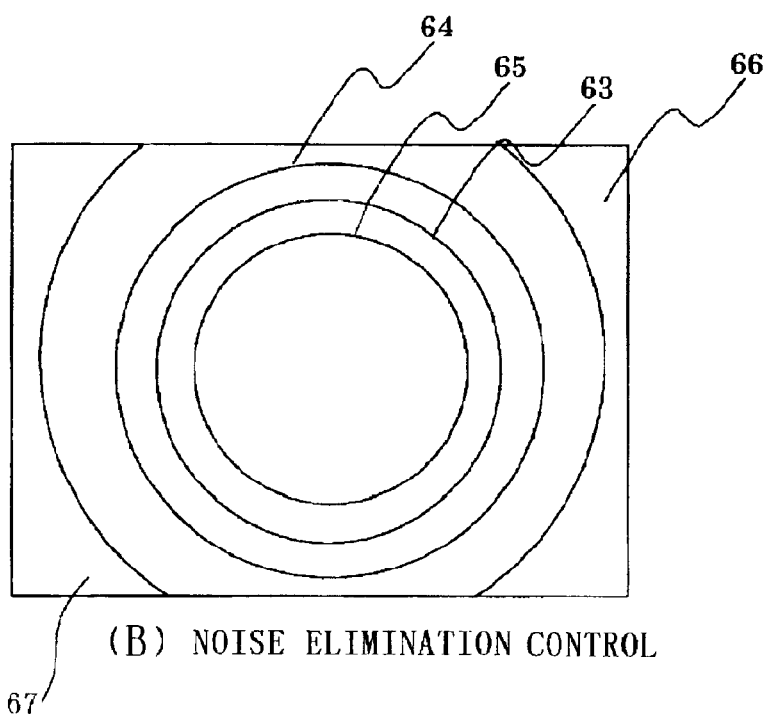
(B) NOISE ELIMINATION CONTROL

Fig. 7

| TV-VIEWING DISTANCE | CLOSER THAN ADEQUATE VIEWING DISTANCE | | | | AROUND ADEQUATE VIEWING DISTANCE | | | | FARTHER THAN ADEQUATE VIEWING DISTANCE | | | |
|---|---|---|---|---|---|---|---|---|---|---|---|---|
| POSITION OF IMAGE ON THE SCREEN | CENTER | | PERIPHERY | | CENTER | | PERIPHERY | | CENTER | | PERIPHERY | |
| FEATURE TYPE OF IMAGE | PLANE | EDGE | PLANE | EDGE | PLANE | EDGE | PLANE | EDGE | PLANE | EDGE | PLANE | EDGE |
| VERTICAL ENHANCEMENT CIRCUIT | MEDIUM | N/A | STRONG | N/A | WEAK | WEAK | MEDIUM | MEDIUM | MEDIUM | MEDIUM | STRONG | STRONG |
| HORIZONTAL ENHANCEMENT CIRCUIT | MEDIUM | N/A | STRONG | N/A | WEAK | N/A | MEDIUM | WEAK | MEDIUM | WEAK | STRONG | MEDIUM |
| VERTICAL WOBBLING | MEDIUM | N/A | WEAK | N/A | WEAK | N/A | N/A | N/A | N/A | N/A | N/A | N/A |
| HORIZONTAL WOBBLING | MEDIUM | N/A | WEAK | N/A | WEAK | N/A | N/A | N/A | N/A | N/A | N/A | N/A |
| VM ENHANCEMENT | N/A | WEAK | N/A | MEDIUM | N/A | MEDIUM | N/A | STRONG | N/A | MEDIUM | N/A | STRONG |

Fig.10
PRIOR ART
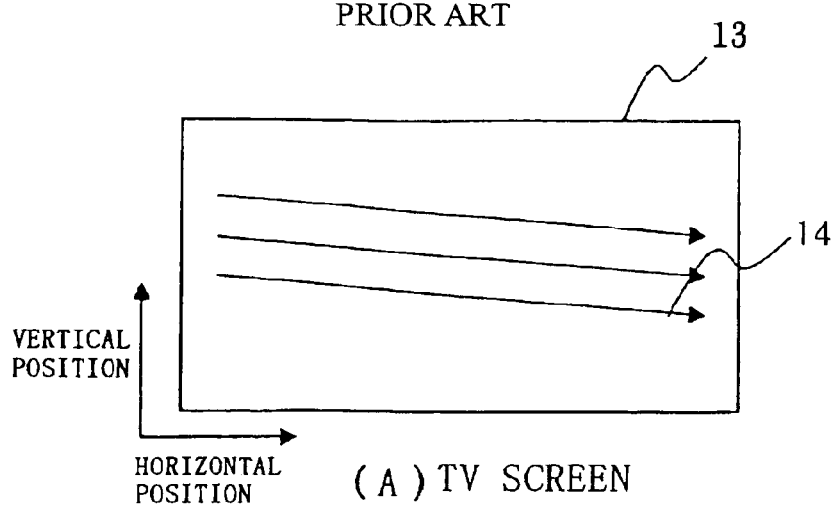
(A) TV SCREEN
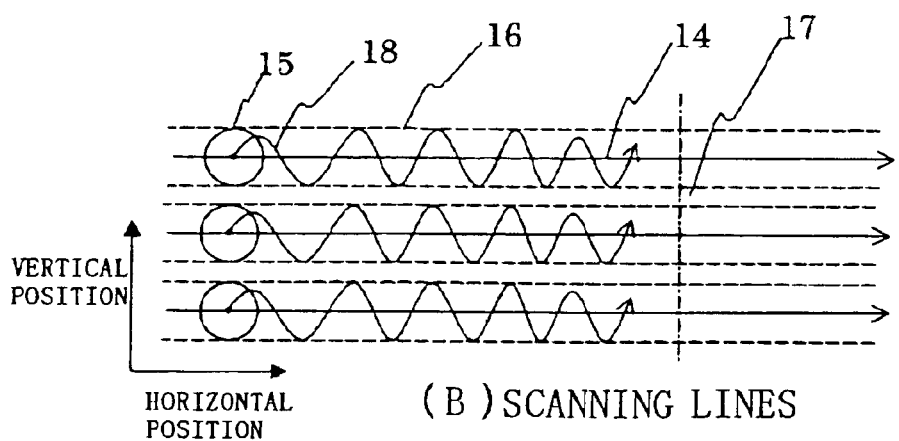
(B) SCANNING LINES
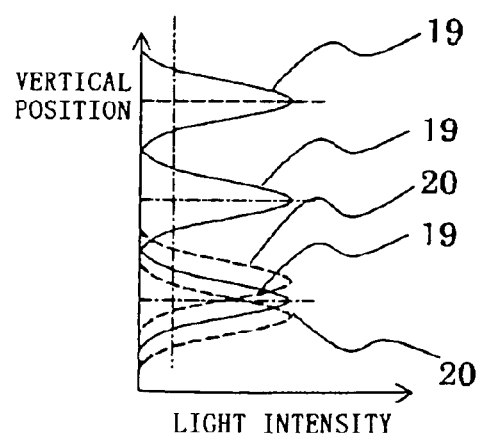
(C) LUMINANCE DISTRIBUTION

SCREEN-NOISE ELIMINATING APPARATUS AND CATHODE-RAY TUBE DISPLAY APPARATUS

BACKGROUND OF THE INVENTION

1. Field of the Invention

The present invention relates to a cathode-ray tube display apparatus using a cathode-ray tube such as a projection TV system and a screen-noise eliminating apparatus.

2. Description of the Related Art

Recently, high-definition broadcasting services with more than 1000 scanning lines have become available for viewers along with the conventional NTSC broadcasting services with 525 scanning lines, and television systems capable of receiving both the services are being used. Among such television systems, in those using cathode-ray tubes (hereinafter referred to as "CRT"), the size of the bright spot (hereinafter referred to as "beam spot") on a phosphor surface generated by an electron beam of the CRT is determined such that adequate display of those high-definition signals with a large number of scanning lines can be obtained, thus, when displaying an NTSC signal having less scanning lines, the use of the same beam spot size would result in gaps on the screen, over which the electron beam does not scan. In order to prevent these gaps, the beam spot size is made larger or the beam spot is wobbled (hereinafter referred to as "wobbling") in the vertical direction across the trace along the scanning lines when displaying a signal having a smaller number of scanning lines.

FIG. 9 is a schematic block diagram indicating a configuration of a prior art projection TV system, which is one of CRT display devices. Illustrated in the diagram are, a TV signal 1, a signal processing circuit 2 for correcting the contrast and brightness of the TV signal 1 and converting it into primary-color signals, a driving circuit 3 for amplifying the signal level for each of the primary-color signals and driving the CRT cathode, a CRT section 4 corresponding to green, blue and red colors, which comprises a CRT 4A, a horizontal deflection coil 4B, a vertical deflection coil 4C and a second vertical deflection coil 4D, a sync separation circuit 5 for separating a synchronization signal from the TV signal 1, a sync generation circuit 6, a horizontal sync signal 7, a vertical sync signal 8, a horizontal deflection driving circuit 9 for driving the horizontal deflection coil 4B according to the horizontal sync signal 7, a vertical deflection driving circuit 10 for driving the vertical deflection coil 4C according to the vertical sync signal 8, a control circuit 11 which identifies the number of scanning lines from the inputted horizontal sync signal 7 and vertical sync signal 8 and outputs a wobbling amplitude control signal, and a second vertical deflection driving circuit 12 for providing high-speed, fine deflection of scanning lines in the vertical direction according to the wobbling amplitude control signal.

The TV signal 1 is inputted into the signal processing circuit 2 which in turn corrects the contrast and brightness of the signal, converts it into primary color signals to be outputted to the driving circuit 3. The driving circuit 3 amplifies the signal level of each primary color signal and outputs it to the CRT section 4. The TV signal 1 is also inputted into the sync separation circuit 5 which separates the sync signal from the TV signal, and the separated sync signal is inputted into the sync generation circuit 6 which outputs the horizontal sync signal 7 and the vertical sync signal 8 generated from the inputted sync signal. The horizontal sync signal 7 is inputted into the horizontal deflection driving circuit 9 which drives the horizontal deflection coil 4B based on the inputted horizontal sync signal 7. The vertical sync signal 8 is inputted into the vertical deflection driving circuit 10 which drives the vertical deflection coil 4C based on the inputted vertical sync signal 8. The control circuit 11 receives inputs of the horizontal sync signal 7 and vertical sync signal 8 and identifies the number of scanning lines, and when the number is found to be smaller than the maximum displayable number of scanning lines, it outputs the wobbling amplitude control signal to the second vertical deflection driving circuit 12 which, in turn, controls the vertical deflection coil 4D to cause the high-speed, fine wobbling of the beam spot in the vertical direction according to the wobbling amplitude control signal.

FIG. 10 shows a set of diagrams illustrating a known scheme for scanning a TV screen and the effect of wobbling in which FIG. 10(A) indicates a screen and scanning lines of a typical cathode-ray tube display apparatus. In the diagram, a display screen 13 and scanning traces 14 of scanning lines are illustrated. FIG. 10(B) is an expanded view of the scanning lines, in which numeral 15 indicates the beam spot on scanning lines, numeral 16 indicates the passing range of the beam spot 15, numeral 17 indicates those areas of the screen that are not scanned by the beam spot 15, and numeral 18 represents the traces of the scanning lines when wobbling is performed. FIG. 10(C) is a diagram showing the beam spot positions and the light intensity. In this diagram, the curves 19 represent the light intensity distributions of the beam spot 15, and the curves 20 represent the light intensity distribution with its extent increased in a vertical location of the screen as a result of the wobbling.

Where a TV signal 1 with a maximum number of scanning lines is inputted into the cathode-ray tube display apparatus, the second vertical deflection driving circuit 12 does not operate, so that the scanning lines would be scanned along the linear traces 14. On the other hand, where a TV signal 1 with less scanning lines is inputted into the cathode-ray tube display apparatus, the wobbling takes place, causing the beam spot 15 to be scanned along the traces 18. While unscanned regions 17 would occur on the screen if the wobbling is not implemented, wobbling with an adequate frequency and amplitude will eliminate such regions 17. The light intensity distribution of the beam spot 15 is represented by the curves 19, but the high-speed, fine wobbling of the beam spot 15 in the vertical direction would cause the light intensity distribution to temporarily move as shown by the curves 20. Furthermore, with a speed sufficiently fast, this movement of the beam spot 15 would not be perceived, and the light intensity would appear to be even, so that as a result of the wobbling, the beam spot 15 is seen as if it has expanded over the regions 17, eliminating the undesired gaps between the scanning lines 14.

FIG. 11 is a graphical representation plotting the frequency analysis result of the wobbling effect for a frame image displayed on e.g. a conventional projection TV system. In the diagram, the horizontal axis represents the spatial frequency in the vertical direction of the screen, the vertical axis represents the relative intensity of the displayed image spectrum, the point fv1 on the horizontal axis represents the maximum vertical frequency with a cycle of two scanning lines, and the point fv2 represents the harmonic spurious frequency twice the fv1, with a cycle of one scanning line.

When a plane signal is displayed on the display screen, the spatial frequency in the vertical direction of the screen essentially has no alternating current component but only a direct current component as indicated by the point 21. However, when the wobbling is not performed, the light intensity distribution is uneven as indicated by the curve 19 of FIG. 10(C), and this yields a spurious component indicated by the point 22.

Generally, when the screen is viewed from a distance farther than the adequate viewing distance which is said to be about 7 times of the screen height in the case of NTSC and about 3 times of the screen height in the case of high definition, the spurious component at the point 22 is difficult to be observed since it is cut due to the low-pass characteristic of human eyes, thus it unlikely causes the degradation of the image quality. However, when the screen is viewed from a distance closer than the adequate viewing distance, it would show as annoying horizontal-line noise. Especially, when an NTSC signal displayed on a cathode-ray tube display apparatus is viewed at the adequate viewing distance for high-definition display, such horizontal-line noise would stand out as the screen is now viewed from a distance closer than one half of the adequate viewing distance for NTSC signals.

When the wobbling is implemented, in the above case, the light intensity distribution of the beam spot 15 becomes as shown by the curves 20 in FIG. 10(C), so that the unevenness in the light intensity distribution in the vertical direction can be reduced. As a result of this, the spurious 22 reduces to the level of the point 23 or point 24 in accordance with amplitude of wobbling, the horizontal-line noise can be decreased.

Generally, an image signal has a frequency bandwidth of fv1 or smaller in the vertical direction. In FIG. 11, the curves 25 through 27 represent the spectrum intensity of an image signal for each type of frequency components, and it is displayed in the intensity indicated by the curve 25 when the wobbling is not performed, and in the intensity indicated by the curve 26 or 27 when the wobbling is performed. As can be seen from the graph, when the wobbling is performed, the high band of the image signal is reduced as spurious reduces.

FIG. 12 is a graphical representation plotting the spatial resolution of human eye as converted into the spatial frequency on a screen. In the diagram, the horizontal axis represents the TV screen spatial frequency, the vertical axis represents the relative response, the curve 28 represents the response at the adequate viewing distance, the curve 29 represents the response at a location closer than the adequate viewing distance, and the curve 30 represents the response at a location farther than the adequate viewing distance. All of them exhibit the low-pass characteristic, but with the band varied according to the viewing distance.

Accordingly, viewing a screen display implementing no wobbling from a location closer than the adequate viewing distance corresponds to observing the image signal indicated by the curve 25 and the spurious component indicated by the point 22 in FIG. 11 with a response indicated by the curve 29 in FIG. 12. Therefore, while the image signal 25 may be viewed clearly, the spurious component at the point 22 is also viewed strongly, so that the horizontal-line noise would stand out.

Furthermore, viewing a TV screen implementing the wobbling from a location closer than the adequate viewing distance corresponds to observing the image signal indicated by the curve 27 and the spurious component 24 in FIG. 11 with a response indicated by the curve 29 in FIG. 12. In this case, the horizontal-line noise would not be observed since the spurious 24 is at a lower level, however, the image quality is degraded since the high band of the curve 27 image signal is reduced. In addition, the curve 27 may be corrected to the level of the curve 26 by adjusting the wobbling intensity, however, since the spurious 24 is also increased to the level of the spurious 23, it is difficult to determine the optimal wobbling intensity.

Viewing a screen display implementing the wobbling from a location farther than the adequate viewing distance corresponds to observing e.g. the image signal indicated by the curve 27 in FIG. 11 with the response indicated by the curve 30 in FIG. 12, so that the image signal 27 has a further reduced high band, resulting in a blurred image.

SUMMARY OF THE INVENTION

In a prior art cathode-ray tube display apparatus, the gaps between scanning lines are assumed to be unseen due to the low-pass characteristic of human eyes, so that there has been problems in that an optimal image quality is obtained only from an adequate viewing distance, and when a TV screen is viewed from a distance other than the adequate viewing distance, both the image quality and the degree of the horizontal-line noise are considerably varied depending on the viewing distance.

The present invention was invented to solve the above problems, and its primary object is to provide a screen noise eliminating apparatus and a cathode-ray tube display apparatus capable of preventing the scanning lines of a TV screen from being seen as the horizontal-line noise without degrading the image quality, and extending the range of the adequate viewing distance. Another object of the present invention is to obtain a screen noise eliminating apparatus and a cathode-ray tube display apparatus capable of providing a high image quality and less difference between the image qualities in the vertical and horizontal directions in any location across the entire display screen. Still another object of the present invention is to obtain a screen noise eliminating apparatus and a cathode-ray tube display apparatus capable of adequately switching the image quality according to the viewing distance.

BRIEF DESCRIPTION OF THE DRAWINGS

FIG. 2(A) is a diagram illustrating the first embodiment of the present invention in which the length of the beam spot is varied by using a second vertical deflection coil, and FIG. 2(B) is a diagram illustrating the first embodiment of the present invention in which the length of the beam spot is varied by using an electrical focus electrode;

FIG. 6(A) is a diagram illustrating an exemplary object displayed on a screen according to the first embodiment of the present invention, and FIG. 6(B) is a diagram indicating the screen locations at which the noise elimination operation is switched;

FIG. 7 is a table listing the operation levels for each element of the noise eliminating circuit according to the first embodiment of the present invention;

FIG. 10 shows a set of diagrams for illustrating the conventional scanning scheme of a TV screen and the wobbling effect, in which:

FIG. 10(A) is a diagram illustrating a screen and scanning lines of a typical cathode-ray tube display apparatus, FIG. 10(B) is a diagram showing an expanded view of the scanning lines, and FIG. 10(C) is a diagram indicating the light intensity distribution over beam spot locations;

DETAILED DESCRIPTION OF THE PREFERRED EMBODIMENT

The present invention will now be explained in greater detail with reference to the attached drawings that illustrate preferred embodiments of the present invention.

Embodiment 1

Figure 1:
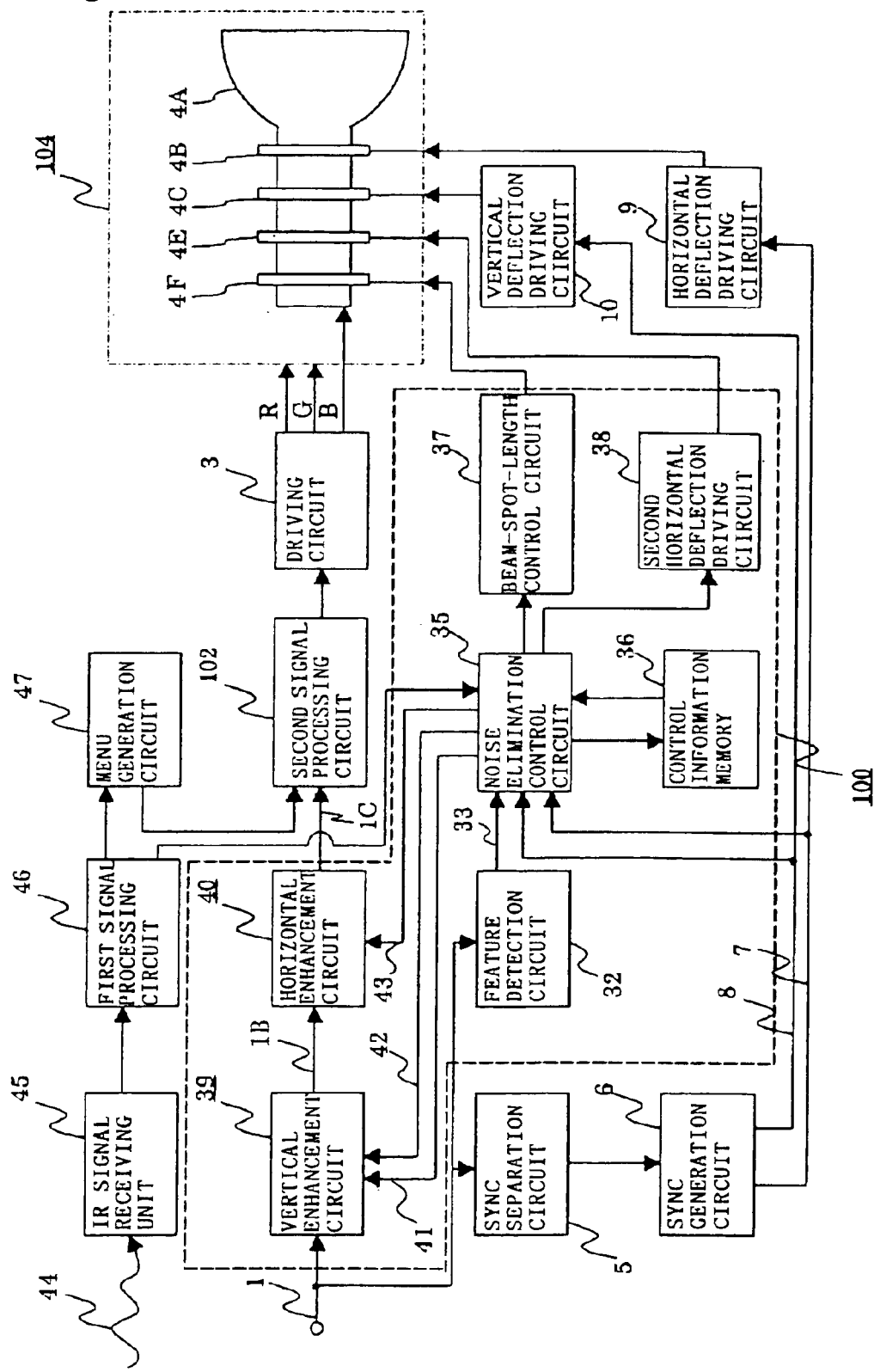
FIG. 1 is a schematic block diagram of a configuration according to the first embodiment of the present invention.

FIG. 1 is a schematic block diagram indicating a configuration according to the first embodiment of the present invention. Indicated in the diagram are, a TV signal 1, a driving circuit 3 for amplifying the signal level of each primary color signal and driving CRT cathodes, a CRT section 104 for green, blue, red colors, which comprises a CRT 4A for displaying the TV signal, a horizontal deflection coil 4B, a vertical deflection coil 4C, a second horizontal deflection coil 4E and a second vertical deflection coil 4F, a sync separation circuit 5 for separating a sync signal from the TV signal 1, a sync generation circuit 6, a horizontal sync signal 7 outputted from the sync generation circuit 6, a vertical sync signal 8 outputted from the sync generation circuit 6, a horizontal deflection driving circuit 9 for driving the horizontal deflection coil 4B according to the horizontal sync signal 7, and a vertical deflection driving circuit 10 for driving the vertical deflection coil 4C according to the vertical sync signal 8.

Also illustrated in the diagram are, a feature detection circuit 32 outputting an edge detection signal 33 obtained by detecting an edge of an image from the TV signal 1, a noise elimination control circuit 35 for compensating the vertical-direction spatial frequency characteristic according to the increase or decrease in the beam spot length, a control information memory 36 for storing the enhancement levels of the high band in the screen regions determined by the CRT 4A and a lens characteristic where a lens (not shown) is used, a beam-spot-length control circuit 37 for increasing or decreasing the vertical length of the beam spot on the display screen generated by the electron beam of the CRT 4A according to the output from the noise elimination control circuit 35, a second horizontal deflection driving circuit 38 for receiving an input of a control signal outputted from the noise elimination control circuit 35 to perform scanning velocity modulation of scanning lines by driving the second horizontal deflection coil 4E according to the control level, a vertical enhancement circuit 39 for providing enhancement to the TV signal 1 for a given vertical-direction spatial characteristic as a preprocess for noise elimination, a horizontal enhancement circuit 40 for enhancing the horizontal-direction high-band frequency of a signal 1B outputted from the vertical enhancement circuit 39 and outputting as a signal 1C, a first control signal 41 outputted from the noise elimination control circuit 35 for switching a delay line of the vertical enhancement circuit 39 depending on whether the TV signal 1 is an interlaced scanning signal or a sequential scanning signal, a second control signal 42 outputted from the noise elimination control circuit 35 for switching the coefficients of the vertical enhancement circuit 39, and a third control signal 43 outputted from the noise elimination control circuit 35 for switching the coefficients of the horizontal enhancement circuit 40.

Furthermore, indicated by numeral 100 is a screen noise elimination circuit block which outputs to the CRT section 104, a signal for performing the wobbling on a given beam from the TV signal 1, and it comprises, as its components, the vertical enhancement circuit 39, the horizontal enhancement circuit 40, the feature detection circuit 32, the noise elimination control circuit 35, the control information memory 36, the beam-spot-length control circuit 37, and the second horizontal deflection driving circuit 38.

Further illustrated are, a transmission light 44 from an IR remote controller (not shown), an IR signal receiving unit 45 receiving the transmission light 44, in which the received signal is amplified and waveform-shaped, and then outputted, a first signal processing circuit 46 for supplying each of various control signals obtained as the output of the IR signal receiving unit 45 to a corresponding circuit, a menu generation circuit 47 for outputting a signal representing a menu screen, which is generated from a signal outputted from the first signal processing circuit 46, and a second signal processing circuit 102 for outputting the output from the menu generation circuit alternatively with the signal 1C.

FIG. 2 presents a couple of diagrams illustrating the beam spot being varied in the length, in which FIG. 2(A) illustrates a case where the element 4F in FIG. 1 is implemented by a second vertical deflection coil, and FIG. 2(B) illustrates a case where the element 4F is implemented as an electric focus electrode.

In FIG. 2(A), the beam spot 15 represents a beam spot in the normal state, the beam spot 15B is a beam spot moved in the vertical direction as a result of wobbling, the lines 16B define a region of a screen in which the beam spot moves, the line segment h1 represents a horizontal position on the screen in which wobbling is not effected, the curve 19 represents the light intensity distribution of the beam spot 15 at the line segment h1, the line segment h2 represents a horizontal position on the screen in which wobbling is effected, the curve 20 represents the light intensity distribution of the beam spot at the line segment h2, and the curve 20B represents the averaged light intensity distribution over a region in which wobbling is effected. While the beam-spot 15 moves from the line segment h1 toward the line segment h2, the second vertical deflection coil 4F is activated to cause the beam spot 15 to move up and down, resulting in a scanning line with an apparent larger width as shown by the curve 16B. By performing the wobbling at a rate sufficiently fast so that the movement of the scanning line will not show, the light intensity distribution of the beam spot in the vertical direction of the screen may be made as shown by the curve 20B, and in this case, the beam spot 15 is not expanded in the horizontal direction of the screen.

In FIG. 2(B), the beam spot 15C represents a beam spot with its electric focus being offset, the lines 16C define a region of the screen in which the beam spot moves, and the curve 20C represents the light intensity distribution of the beam spot within a region in which the focus is being offset. As the beam spot 15 moves from the position h1 to the position h2, the electric focus electrode is activated to cause the focus of the beam to be offset from an optimal point, so that the apparent width of the scanning line is seen larger as shown by the curve 20C. In this case, the beam spot 15 is expanded also in the horizontal direction of the screen as it is shaped as the beam spot 15C, so that the high band of the horizontal-direction spatial frequency of the displayed image is degraded.

Figure 3:
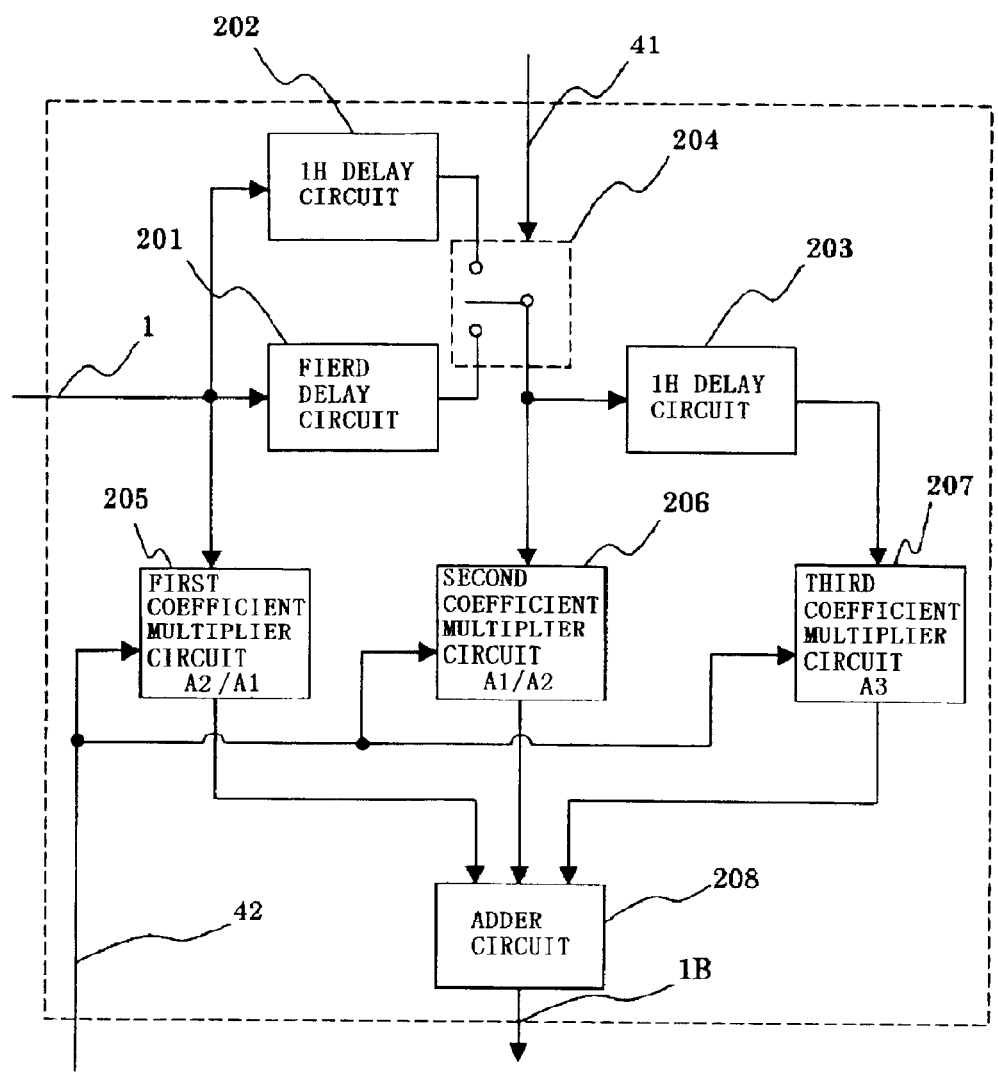
FIG. 3 is a schematic block diagram indicating a configuration of a vertical enhancement circuit in the first embodiment of the present invention.

FIG. 3 is a schematic block diagram illustrating a configuration of the vertical enhancement circuit 39. In the diagram, it is illustrated as comprising a field delay circuit 201 for delaying the TV signal 1 by 1 field time period, 1H delay circuits 202 and 203 for delaying the TV signal 1 by one horizontal time, a selection circuit 204 for selecting a signal, a first coefficient multiplier circuit 205, a second coefficient multiplier circuit 206, a third coefficient multiplier circuit 207 and an adder circuit 208.

Here, the selection circuit 204 selects either the output of the field delay circuit 201 or the output of the 1H delay circuit 202, and the selected output is connected to the 1H delay circuit 203 located in the later stage, thereby constituting a 2-stage filter circuit with 3 taps. The first control signal 41 controls the selection circuit 204, and in this selection, where the TV signal 1 is an interlaced scanning signal, the output of the field delay circuit 201 is selected, and where it is a sequential scanning signal, the output of the 1H delay circuit 202 is selected, so that in either case, high-band enhancement of the vertical-direction frequency characteristic is performed based on the signal levels of 3 consecutive scanning lines as a frame signal.

Furthermore, each of the first, second and third coefficient multiplier circuits 205, 206 and 207 selects a coefficient value held in a table under the control of the second control signal 42, and the selection of the coefficient value of each circuit is done according to the following conditions. Where the TV signal 1 is an interlaced scanning signal, the first, second and third coefficient multiplier circuits 205, 206 and 207 select, respectively, a coefficient A2, a coefficient A1 and a coefficient A3 from the table. Where the TV signal 1 is a sequential scanning signal, the first, second and third coefficient multiplier circuit 205, 206 and 207 select, respectively, a coefficient A1, a coefficient A2 and a coefficient A3 from the table. Here, in the table associated with the coefficient multiplier circuits, sets of values in the relationships $A1=-k_1$, $A2=1+2\times k_1$ and $A3=-k_1$ (where $k_1$ is an approximate value of 0 or greater and 0.5 or smaller) are set for multiple values of $k_1$ in advance, and under the control of the second control signal 42, each of the coefficient multiplier circuits 205 through 207 selects particular $k_1$ and coefficient values corresponding to the scanning scheme to provide the result of the multiplication of the inputted values as an output. The signals outputted from the first, second and third coefficient multiplier circuits 205, 206 and 207 are inputted into the adder circuit 208 to be summed and outputted as a signal 1B.

Figure 4:
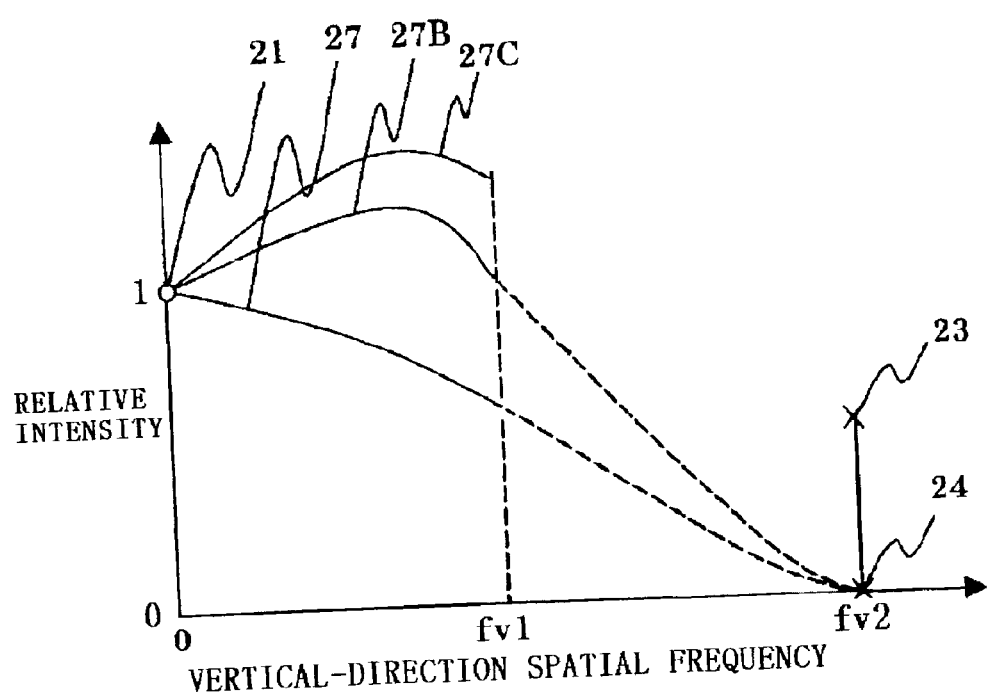
FIG. 4 is a diagram indicating the vertical-direction spatial frequency characteristic of an image on a CRT phosphor surface according to the first embodiment of the present invention.

FIG. 4 is a diagram indicating the vertical-direction spatial frequency characteristic obtained as a result of high-band frequency enhancement by the high-band frequency enhancement characteristic of the vertical enhancement circuit 39. In the diagram, the curve 27 represents the frequency characteristic exhibiting high-band degradation due to the scanning-line wobbling which will be explained later, the curve 27B represents the frequency characteristic of the curve 27 being high-band enhanced by the vertical enhancement circuit 39, and the curve 27C represents the frequency characteristic obtained by removing only the vertical wobbling from the curve 27B. In the diagram, the curve 27B exhibits a substantially flat characteristic at the frequency fv1 or below, and at the same time, the spurious at the frequency fv2 is at the level indicated by the point 24, so that it represents a reduced noise level and smaller degradation in the frequency characteristic of the image. In FIG. 4, the curve 27C is the high-band enhancement characteristic when the screen is being viewed at a location farther than the adequate viewing distance as will be explained below.

From the above, it is understood that the noise elimination control circuit 35 provides the control so as to reduce spurious in the vertical-direction spatial frequency corresponding to the gaps between scanning lines, and to enhance the high band of the vertical-direction spatial frequency.

Figure 5:
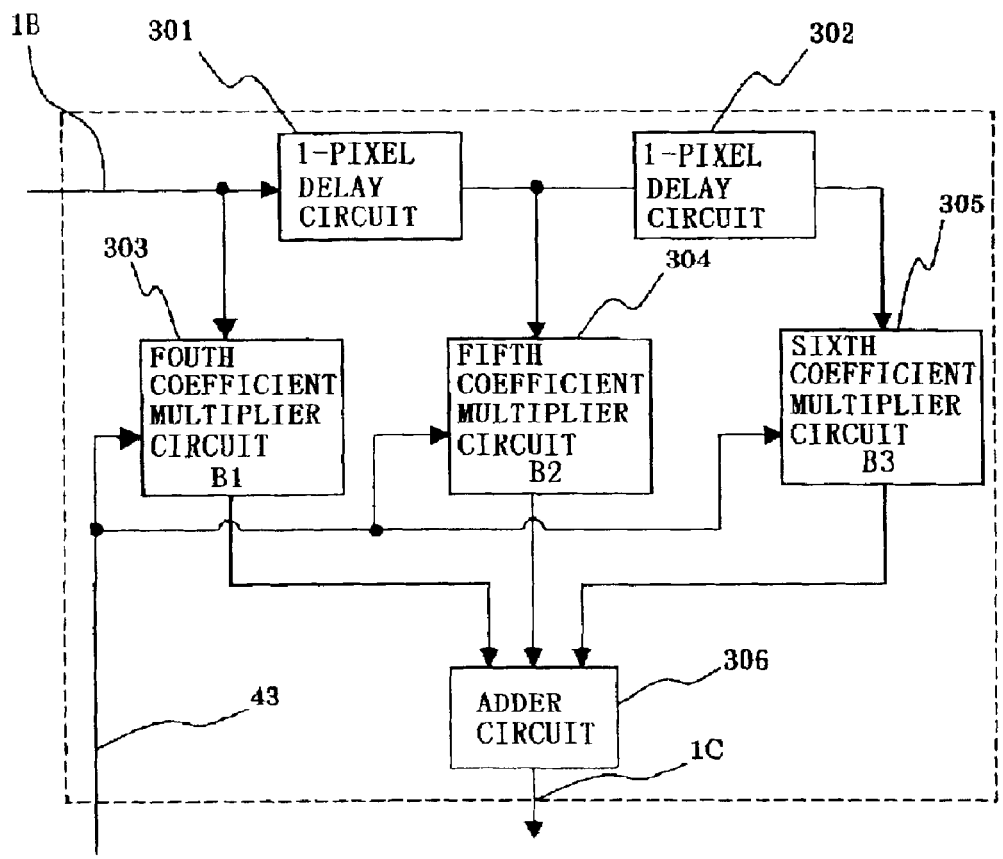
FIG. 5 is a schematic block diagram indicating a configuration of a horizontal enhancement circuit in the first embodiment of the resent invention.

FIG. 5 is a block diagram indicating a configuration of the horizontal enhancement circuit 40 which receives the signal 1B outputted from the circuit 39 and outputs a signal 1C which is a signal with an enhanced horizontal-direction high-band frequency. The horizontal enhancement circuit 40 is controlled by the noise elimination control circuit 35, and is the one to enhance the high band of the horizontal-direction spatial frequency characteristic according to the change in the beam spot length.

Illustrated in the diagram are, 1-pixel time delay circuits 301 and 302, a fourth coefficient multiplier circuit 303, a fifth coefficient multiplier circuit 304, a sixth coefficient multiplier circuit 305 and an adder circuit 306. The fourth, fifth and sixth coefficient multiplier circuits 303, 304 and 305 select respective coefficient values held in a table under the control of the third control signal 43, and the selection of the coefficient values is done according to the following conditions. The fourth, fifth and sixth coefficient multiplier circuits select, respectively, a coefficient B1, a coefficient B2 and a coefficient B3 from the table. Here, sets of values in the relationships $B1=-k_2$, $B2=1+2\times k_2$ and $B3=-k_2$ are respectively set for multiple values of $k_2$ (where $k_2$ is an approximate value of 0 or greater and 0.5 or smaller) in advance, and in response to the reception of the third control signal 43, each coefficient multiplier circuit selects a coefficient corresponding to a specific value of k, and outputs a result of the multiplication performed on the inputted values. The signals outputted from the fourth, fifth and sixth coefficient multipliers 303, 304 and 305 are inputted into the adder circuit 306 to be summed and outputted as a signal 1C.

When the horizontal-direction frequency characteristic is expected to be degraded due to the increased vertical length of the beam spot 15 as previously explained, the horizontal enhancement circuit 40 performs enhancement in advance to compensate it, and at the same time, where the screen is viewed from a distance longer than the adequate viewing distance, performs high-band enhancement in the horizontal direction.

The feature detection circuit 32 receives the TV signal 1 and performs edge detection of the image, and if it detects an edge, it outputs an edge detection signal 33 to the noise elimination control circuit 35. While the edge detection method is not limited to any particular scheme, it may be implemented by any known method through computation of the signal levels of target pixels and the peripheral pixels. For example, a first-order or second-order differential operator such as the ones described in a material published by The Institute of Electrical Engineers in Japan, entitled "Hikari-to-Gazou-no-Kisokougaku (Basic Engineering of Light and Image)" (pp.256–257) may be used. In order to keep the signal level of the peripheral image, signal delay lines are used. The circuit configuration of the feature detection circuit is determined according to the equation of the selected differential operator, however, it is of course unnecessary to provide separate delay lines when this differentiation may be implemented by using the outputs of the signal delay lines forming a part of the vertical and horizontal enhancement circuits 39 and 40.

Next, the noise elimination control circuit 35 receives the horizontal sync signal 7 and vertical sync signal 8 outputted from the sync generation circuit 6, and at the same time, it also receives the edge detection signal 33 outputted from the feature detection circuit 32. Generally, an edge section is represented by a stepped, or a pulsed signal, so that the spatial frequency spectrum of the image extends over a large frequency bandwidth. The noise elimination from the screen is realized by frequency enhancement in the preprocess and the frequency reduction through increasing the length of the beam spot 15, and during this processes, delicate variation is incurred in the spatial frequency characteristic. Therefore, performing the noise elimination to a substantial degree on a signal which originally has a wide spatial frequency spectrum may result in the variation in the frequency characteristic, and it may cause ringing or overshooting in the edge section. Accordingly, for edge sections, the noise elimination is not performed at all, or is performed only to a smaller degree.

That is, the noise elimination control circuit 35 provides control in such a manner that the extent of the increase or decrease in the beam spot length is reduced for image edge sections in response to the output from the feature detection circuit 32. The noise elimination control circuit 35 also provides control in such a manner that the degree of the modulation in the scanning velocity in the horizontal direction is minimized for image edge sections in response to the output from the feature detection circuit 32.

FIG. 6 shows a couple of diagrams illustrating a region over which the noise elimination control circuit 35 performs noise elimination for an object displayed on the screen, in which FIG. 6(A) illustrates a screen displaying a round object, and FIG. 6(B) illustrates screen regions corresponding to respective controlling operations. In FIG. 6(A), a display screen 13, a circular object region 61 with high luminance, a low-luminance region outside the object region 61 and an edge 63 of the object region 61 are indicated. The object region 61 is displayed through horizontal scanning of the scanning lines 14 shown in FIG. 10, and while it is displayed, the length of the beam spot 15 in the vertical direction on the screen is under the effect of the wobbling in the manner as indicated in FIG. 2(A). The wobbling is performed any locations other than the proximity of the edge 63. FIG. 6(B) indicates those screen regions at which the controlling operations of the noise elimination control circuit 35 are switched, and the region surrounded by the curves 64 and 65 is a region for which the feature detection circuit would output the edge detection signals, and the regions 66 and 67 are screen peripheral regions in which the beam spot 15 tends to appear larger due to the component characteristics of the CRT section 104 and the projection lens (not shown).

Since the high band of the spatial frequency characteristic of the displayed image would have initially been degraded in the regions 66 and 67, the noise elimination control circuit 35, during the course of its noise elimination operation, provides control in such a manner that high-band image signals can be enhanced. The positions of the regions 66 and 67 on the screen and the high-band enhancement level in these regions are dependent upon the CRT section 104 and the projection lens (not shown), thus, they are stored in the control information memory 36 in advance, and read out at a necessary timing to cause the control signal indicating the operation level to be outputted to the vertical enhancement circuit 39, horizontal enhancement circuit 40, beam-spot-length control circuit 37 and the second horizontal deflection driving circuit 38.

The second horizontal deflection driving circuit 38 receives the control signal outputted by the noise elimination control circuit 35 and scanning velocity modulation of the scanning lines by driving the second horizontal deflection coil 4E according to the control level. The scanning velocity modulation is a public-known technique called velocity modulation (VM), and is normally implemented so as to enhance the edge in the edge section 63 of an image. In the present embodiment, the high-band reduction of the horizontal-direction spatial frequency is further performed through high-speed velocity wobbling for plane sections of an image, thereby to reduce the pulse noise etc. superimposed upon the signal inside a cathode-ray tube display apparatus. The high-band frequency to be reduced through the velocity wobbling is enhanced in advance in the horizontal enhancement circuit 40. The velocity wobbling is performed in the cycle of amplitude according to the vertical-direction wobbling shown in FIG. 2(A).

The control operation pattern of the noise elimination control circuit 35 will now be explained in greater detail. FIG. 7 is a table listing the operation levels of each of the elements in the noise elimination circuit block 100 for the combinations of screen-viewing location, position of an image on the display screen, and feature type of the image (whether it is an edge or plane). In the table, "Strong" refers to the operation being effected at a strong level, "Medium" refers to the operation being effected at a medium level, "Weak" refers to the operation being effected at a weak level, and "N/A" refers to halt of the operation. As for the screen positions, the indication of "Center" refers to an area which is located in neither the region 66 nor region 67 in FIG. 6(B), and "Periphery" refers to an area located in the region 66 or 67.

For instance, when the TV system is being viewed from a distance closer than the adequate viewing distance, in a plane section at the center of the screen, the operation levels of the respective elements are controlled as listed in the leftmost column of the table; vertical enhancement circuit 39=Medium level, horizontal enhancement circuit 40=Medium level, spot length control circuit 37=Medium level of vertical wobbling, and second horizontal deflection driving circuit 38=Medium level of horizontal wobbling. In this case, the second deflection driving circuit 38 does not perform image enhancement through velocity modulation at the edge section of the image.

The combinations of operation levels listed in FIG. 7 may be so configured to allow the noise elimination function to be emphasized when being viewed from a distance closer than the adequate viewing distance, and the high-band enhancement function of the image quality to be emphasized when being viewed from a distance farther than the adequate viewing distance, so that various combinations and modifications are possible for the set levels. That is, where the display screen is viewed from a distance closer than the adequate viewing distance, the noise elimination control circuit 35 controls to lengthen the beam spot, and where the display screen is viewed from a distance farther than the adequate viewing distance, then the circuit 35 does not allow to vary the beam spot length, and controls to enhance a given vertical and horizontal-direction spatial frequency characteristic.

A control signal representing a distance from which the screen is viewed (as indicated in FIG. 7) is generated and transmitted in the following manner. When operating on the cathode-ray tube display apparatus, a user uses a remote controller (not shown) to transmit a remote-control signal 44, which is then inputted into an IR signal receiving unit 45, amplified and waveform-shaped, and then outputted to the first signal processing circuit 46. The first signal processing circuit 46, based on the inputted signal, outputs various control signals such as Power On/Off. to be inputted into respective circuits (not shown). Where the first signal processing circuit 46 received a menu display command, it also outputs a control signal for invoking menu display to the menu generation circuit 47. The menu generation circuit 47, in response to the control signal, generates a signal for a menu screen such as the one shown in FIG. 7, which is then inputted into the second signal processing circuit 102. The second signal processing circuit 102 selects and input the inputted menu signal so that it is displayed on the display screen instead of the signal 1C.

Figure 8:
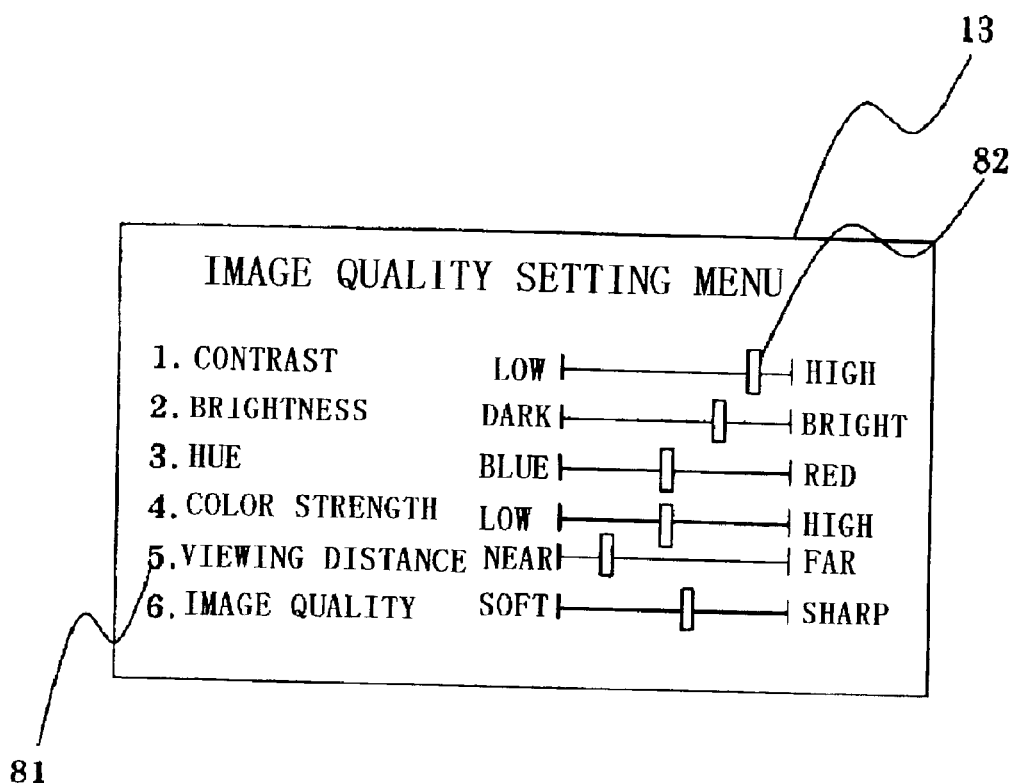
FIG. 8 is a diagram illustrating means for selecting a screen-viewing location according to the first embodiment of the present invention.
Figure 9:
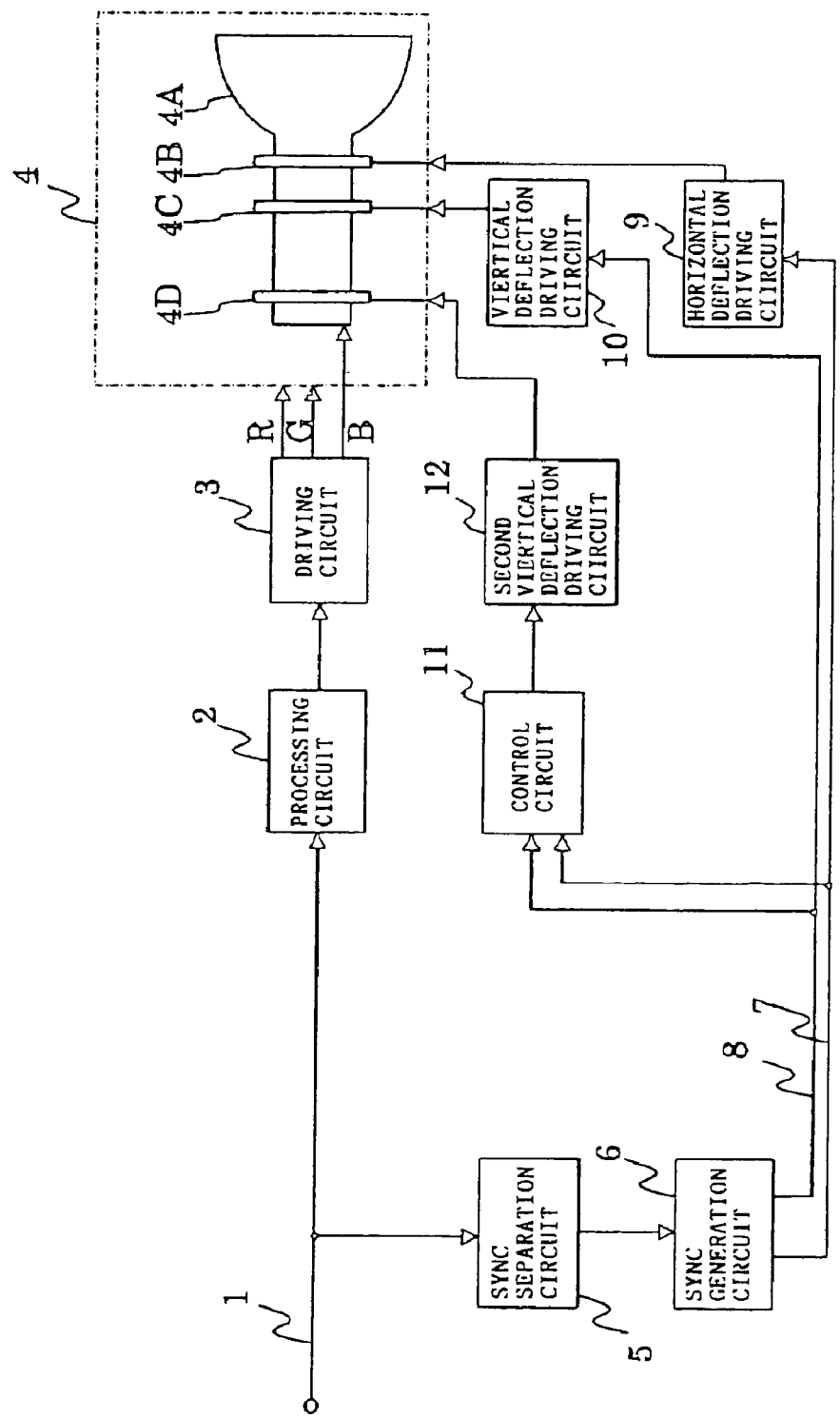
FIG. 9 is a schematic block diagram indicating a configuration of a prior art projection TV system.
Figure 11:
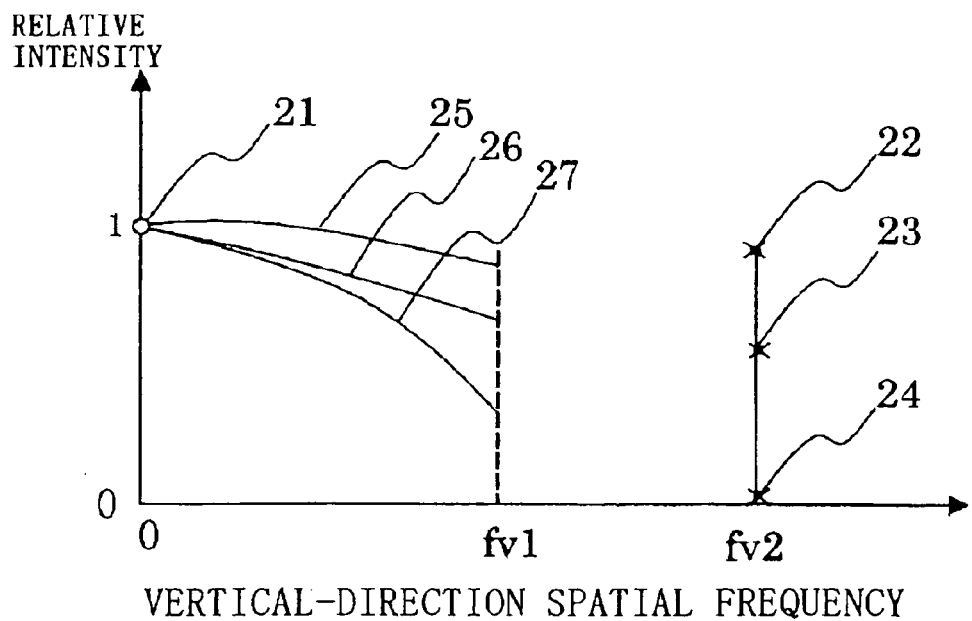
FIG. 11 is a graph plotting a frequency analysis result of the wobbling effect for a frame image displayed on a prior art cathode-ray tube display apparatus such as a projection TV system.
Figure 12:
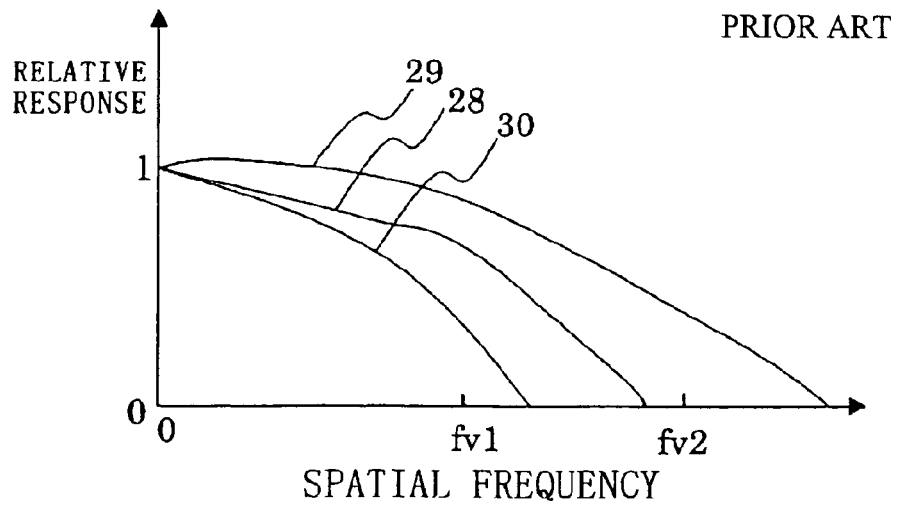
FIG. 12 is a diagram indicating the spatial resolution of human eyes as converted into the spatial frequency on a screen.

Shown in FIG. 8 is an image-quality setting menu which is an exemplary menu screen, and it illustrates a display screen 13, menu items 81, and adjustment sliders 82. After the menu is displayed as a result of the operation through the remote controller, a menu item 81 is selected by e.g. pushing "Up" or "Down" button on the remote-controller, and then pushing "Left" or "Right" button to move the adjustment slider 82 to the left or right. The TV-viewing distance setting is provided as the fifth menu item, and it may be set "Close" by moving the adjustment slider to the left, and "Far" by moving the slider to the right.

In this embodiment, the means for setting viewing distance was explained as being implemented through the manipulation of the menu, however, it may also be implemented through any other method, for example, by providing distance-setting buttons on the remote-controller, and in this case, three buttons indicating "Close", "Far" and "Normal" may allow a simpler operation without requiring the use of the menu screen. Also, in this case, the configuration of the signal processing circuit 102 may be modified so that it can be adapted to the characteristics of the noise elimination circuit as determined based on the manipulation of the distance-setting buttons. For example, when the screen is viewed from a "Far" location, then the "Image Quality" is adjusted toward the side of "Sharp".

Where the cathode-ray tube display apparatus is capable of displaying signals of different numbers of scanning lines, the noise elimination characteristics of the noise elimination circuit 100 is switched to a set which is adequate for the corresponding signal type. The signal type is determined by the noise elimination control circuit 35 based on the timings or frequencies of the horizontal sync signal 7 and vertical sync signal 8 after these signals are inputted. As many sets of values as the signal types are predetermined and stored in the memory 36 for the operation levels shown in FIG. 7. The criteria for determining a position of an image on the screen, whether it is located in the center or periphery area of the screen, may vary for each signal type, and in this case, determination information comprising horizontal timing and vertical timing is stored in the memory 36 for each of the signal types. The noise elimination control circuit 35 also determines whether the signal is a sequential scanning signal or an interlaced scanning signal, and switches the noise elimination characteristic.

Embodiment 2

In FIG. 1, the element 4F has been explained as being a second vertical deflection coil, however, it is not limited, and it may also be any other component, for example, an electromagnetic 4-pole focus coil or an electrical focus electrode such as electrostatic focus electrode or electromagnetic focus electrode. When the element 4F is constituted by any of the above alternatives, the beam-spot-length control circuit 37 shall, of course, be a circuit having a corresponding driving capability, such as an electrostatic focus driving circuit or an electromagnetic focus driving circuit. Also, the element 4F does not have to be provided separately when the TV system originally has any component having the same function, and any means capable of changing the vertical length of the beam spot at a changing speed that can follow the changes in an image signal may be shared for this function, and it may be configured by adding a modulation signal to an existing circuit.

Since these present embodiments are configured in the above-explained manner, they may provide the following effects.

By adjusting the vertical length of a beam spot on the phosphor screen using the beam-spot-length controlling means, and enhancing given high-band frequencies by the vertical enhancement means, horizontal-line noise may easily be eliminated, and the degradation of the vertical-direction spatial frequency may be prevented, thereby allowing the image quality to be retained at a high level.

In addition, by reducing the spurious corresponding to the scanning line interval at a vertical-direction spatial frequency on the display screen and by enhancing the high band of the vertical-direction spatial frequency, noise elimination is realized with neither making the horizontal-line noise apparent nor degrading the image quality.

Furthermore, the noise elimination control means controls the second horizontal deflection means so as to modulate the horizontal scanning velocity of the electron beam in the cathode-ray tube, thereby allowing the image quality in the horizontal direction to be made equal to the image quality in the vertical direction.

The noise elimination control means controls the horizontal enhancement means to enhance a given horizontal-direction spatial frequency characteristic of a TV signal, so that the degradation of the high band of the horizontal-direction spatial frequency may be compensated.

The noise elimination control means, by using an image edge signal received from the feature detection means, also controls the beam-spot-length control means to reduce the extent of modulation which lengthens the bright spot on the phosphor screen in the vertical direction in an edge section of an image, so that the occurrence of ringing and overshooting may be minimized, thereby allowing to maintain the image quality of the edge section of the image.

Moreover, by using an edge signal of an image inputted from the feature detection means, the noise elimination control means controls the second horizontal deflection means to minimize the modulation of the scanning velocity in the horizontal direction in an edge section of the image, so that the image quality of the edge section of the image may be maintained.

Furthermore, according to the enhancement level of the spatial frequency characteristic of a location on the screen inputted from the control information memory, the noise elimination control means controls the beam-spot-length controlling means to lengthen or shorten a bright spot on the phosphor surface in the vertical direction according to the position on the screen, so that horizontal-line noise may be eliminated uniformly across the entire display screen.

Still further, according to the enhancement level of the spatial frequency characteristic of a position on the screen inputted from the control information memory, the noise elimination control means also controls the second horizontal deflection means to modulate the horizontal scanning velocity according to the position on the screen, thereby allowing the image quality in the horizontal direction to be made equal to the image quality in the vertical direction over the entire display screen.

The noise elimination control means further controls the beam-spot-length control means to increase the length of the bright spot on the phosphor surface in the vertical direction when the screen is viewed from a distance closer than the adequate viewing distance, and controls the beam-spot-length control means not to increase the length of the bright spot on the phosphor surface in the vertical direction when the screen is viewed from a distance larger than the adequate viewing distance, so that enhancement of the image quality is attempted according to the viewing distance.

The vertical enhancement means is controlled by the first and second control signals, thereby implementing the enhancement of the vertical spatial frequency according to the type of the TV signal and the length of the beam spot.

The horizontal enhancement means is controlled by the third control signal inputted from the noise elimination control means, thereby implementing the enhancement of the horizontal spatial frequency corresponding to the modulation of the scanning velocity in the horizontal direction.

Furthermore, in a cathode-ray tube display apparatus according to the present invention, the screen-noise elimination control means is capable of increasing and decreasing the length of the beam spot in the vertical direction, as well as controlling to enhance a given vertical spatial frequency characteristic so as to compensate the vertical spatial frequency, thus, the horizontal-line noise may easily be eliminated while retaining a high image quality.

Moreover, by providing an electrostatic focus electrode, and in the noise eliminating apparatus, providing the electrostatic-focus-electrode driving circuit, the horizontal-line noise may be eliminated without requiring the modulation of the scanning-line deflection signal.

Furthermore, by providing an electromagnetic focus coil, and in the noise eliminating apparatus, providing the electromagnetic-focus-coil driving circuit, the horizontal-line noise may be eliminated without requiring the modulation of the scanning-line deflection signal.

Still further, by providing a second vertical deflection coil, and in the noise eliminating apparatus, providing the second-vertical-deflection-coil driving circuit, the gaps between scanning lines may be filled without incurring the expansion in the horizontal direction of the screen.

What is claimed is:

1. A screen-noise eliminating apparatus comprising:
   a beam-spot-length control element for controlling the vertical length of a beam spot on a display screen generated by an electron beam of a cathode-ray tube for displaying a TV signal, said beam-spot-length control element operating to create a beam spot in a first state when a number of scanning lines in the TV signal exceeds a certain number, and operating to create a beam spot in a second state when a number of scanning lines in the TV signal is less than a certain number, wherein the beam spot has a greater vertical beam length in said second state than in said first state;
   a vertical enhancement element for enhancing a given vertical-direction spatial frequency characteristic of said TV signal; and
   a noise elimination control element for controlling said beam-spot-length control element and said vertical enhancement element so as to compensate said vertical-direction spatial frequency characteristic according to the beam spot length resulting from operation of said beam-spot-length control element.

2. A screen-noise eliminating apparatus as claimed in claim 1 wherein said noise elimination control element provides control in a manner so as to reduce spurious in said vertical-direction spatial frequency corresponding to a scanning-line interval, and enhance the high band of said vertical-direction spatial frequency.

3. A screen-noise eliminating apparatus as claimed in claim 1 further comprising a feature detection element for detecting an edge of an image to be displayed from said TV signal wherein said noise elimination control element controls to reduce the extent of increase or decrease in said beam spot length upon an output from said feature detection element.

4. A screen-noise eliminating apparatus comprising:
   a beam-spot-length control element for increasing or decreasing the vertical length of a beam spot on a display screen generated by an electron beam of a cathode-ray tube for displaying a TV signal;
   a vertical enhancement element for enhancing a given vertical-direction spatial frequency characteristic of said TV signal;
   a noise elimination control element for controlling said beam-spot-length control element and said vertical enhancement element so as to compensate said vertical-direction spatial frequency characteristic according to the increase or decrease of said beam spot length; and
   a horizontal deflection element for modulating a scanning velocity of said electron beam in the horizontal direction wherein said noise elimination control element controls said horizontal deflection element in a manner so as to reduce the high band of a horizontal direction spatial frequency characteristic according to the increase or decrease of said beam spot length.

5. A screen-noise eliminating apparatus as claimed in claim 4 further comprising a horizontal enhancement element for enhancing a given horizontal-direction spatial frequency characteristic of said TV signal wherein said noise elimination control element controls said horizontal enhancement element in a manner so as to compensate said horizontal-direction spatial frequency characteristic according to the increase or decrease of said beam spot length.

6. A screen-noise eliminating apparatus as claimed in claim 4 further comprising a feature detection element for detecting an edge of an image to be displayed from said TV signal wherein said noise elimination control element controls to reduce the extent of said modulation of the scanning velocity in the horizontal direction in the edge section of the image upon an output from said feature detection element.

7. A screen-noise eliminating apparatus as claimed in claim 4 further comprising a control information memory storing enhancement levels of the spatial frequency characteristic at respective positions on the screen wherein said noise elimination control element causes to modulate said scanning velocity in the horizontal direction according to an output of said control information memory.

8. A screen-noise eliminating apparatus as claimed in claim 5 wherein said horizontal enhancement element comprises:
   a first coefficient multiplier element for multiplying said TV signal by a first coefficient determined by a control signal inputted from said noise elimination control element;
   a second coefficient multiplier element for delaying a summed signal by 1-pixel time and multiplying it by a second coefficient determined by said control signal;
   a third coefficient multiplier element for delaying said summed signal by 2-pixel time and multiplying it by a third coefficient determined by said control signal; and
   an adder element for outputting another summed signal which is a sum of the output of said first coefficient multiplier element, the output of said second coefficient multiplier element and the output of said third coefficient multiplier element.

9. A screen-noise eliminating apparatus comprising:
   a beam-spot-length control element for increasing or decreasing the vertical length of a beam spot on a display screen generated by an electron beam of a cathode-ray tube for displaying a TV signal;
   a vertical enhancement element for enhancing a given vertical-direction spatial frequency characteristic of said TV signal;
   a noise elimination control element for controlling said beam-spot-length control element and said vertical enhancement element so as to compensate said vertical-direction spatial frequency characteristic according to the increase or decrease of said beam spot length; and
   a control information memory storing enhancement levels of the spatial frequency characteristic at respective positions on the screen wherein said noise elimination control element controls the increase or decrease of said beam spot length according to an output of said control information memory.

10. A screen-noise eliminating apparatus comprising:
    a beam-spot-length control element for increasing or decreasing the vertical length of a beam spot on a display screen generated by an electron beam of a cathode-ray tube for displaying a TV signal;
    a vertical enhancement element for enhancing a given vertical-direction spatial frequency characteristic of said TV signal;
    a noise elimination control element for controlling said beam-spot-length control element and said vertical enhancement element so as to compensate said vertical-direction spatial frequency characteristic according to the increase or decrease of said beam spot length, wherein said noise elimination control element controls said beam spot length to be lengthened in the vertical direction when the display screen is viewed from a distance closer than an adequate viewing distance, and controls said beam spot length to be unchanged and said given vertical-direction spatial frequency characteristic and horizontal-direction spatial frequency characteristic to be enhanced when the display screen is viewed from a distance farther than the adequate viewing distance.

11. A screen-noise eliminating apparatus comprising:

a beam-spot-length control element for increasing or decreasing the vertical length of a beam spot on a display screen generated by an electron beam of a cathode-ray tube for displaying a TV signal;

a vertical enhancement element for enhancing a given vertical-direction spatial frequency characteristic of said TV signal; and a noise elimination control element for controlling said beam-spot-length control element and said vertical enhancement element so as to compensate said vertical-direction spatial frequency characteristic according to the increase or decrease of said beam spot length, wherein said vertical enhancement element comprises:

a 1H delay element for delaying said TV signal by one horizontal scanning line;

a 1-field delay element for delaying said TV signal by 1 field;

a signal selection element for selecting an output of said 1-field delay element when a first control signal inputted from said noise elimination control element indicates an interlaced scanning signal, and selecting an output of said 1H delay element when said first control signal indicates a sequential scanning signal, and outputting said selected output;

a first coefficient multiplier element for multiplying said TV signal by a first coefficient determined by a second control signal outputted from said noise elimination control element;

a second coefficient multiplier element for multiplying the output from said signal selection element by a second coefficient determined by said second control signal;

a third coefficient multiplier element for delaying the output from said signal selection element by 1H and multiplying it by a third coefficient determined by said second control signal; and an adder element for outputting a summed signal which represents a sum of the output of said first coefficient multiplier element, the output of said second coefficient multiplier element and the output of said third coefficient multiplier element.

12. A cathode-ray tube display apparatus comprising:

a cathode-ray tube for displaying a TV signal;

an electron-beam driving element for driving an electron beam of said cathode-ray tube; and a screen-noise eliminating apparatus, wherein said screen-noise eliminating apparatus comprises:

a beam-spot-length control element controlling the length of a beam spot on a display screen generated by said electron beam in the vertical direction, said beam-spot-length control element operating to create a beam spot in a first state when a number of scanning lines in the TV signal exceeds a certain number, and operating to create a beam spot in a second state when a number of scanning lines in the TV signal is less than a certain number, wherein the beam spot has a greater beam length in said second state than in said first state;

a vertical enhancement element for enhancing a given vertical-direction spatial frequency characteristic of said TV signal; and a screen-noise elimination control element for controlling said beam-spot-length control element and said vertical enhancement element so as to compensate said vertical-direction spatial frequency characteristic according to the beam spot length resulting from operation of said beam-spot-length control element.

13. A cathode-ray tube display apparatus as claimed in claim 12 wherein said electron-beam driving element comprises an electrostatic focus electrode, and said beam-spot-length control element comprises a driving circuit for said electrostatic focus electrode.

14. A cathode-ray tube display apparatus as claimed in claim 12 wherein said electron-beam driving element comprises an electromagnetic focus coil, and said beam-spot-length control element comprises a driving circuit for said electromagnetic focus coil.

15. A cathode-ray tube display apparatus as claimed in claim 12 wherein said electron-beam driving element comprises a vertical deflection coil, and said beam-spot-length control element comprises a driving circuit for said vertical deflection coil.

* * * * *